April 11, 1944.  C. G. TURNER  2,346,242
APPARATUS FOR CUTTING AND PANNING BISCUITS
Filed Aug. 2, 1940  2 Sheets-Sheet 2
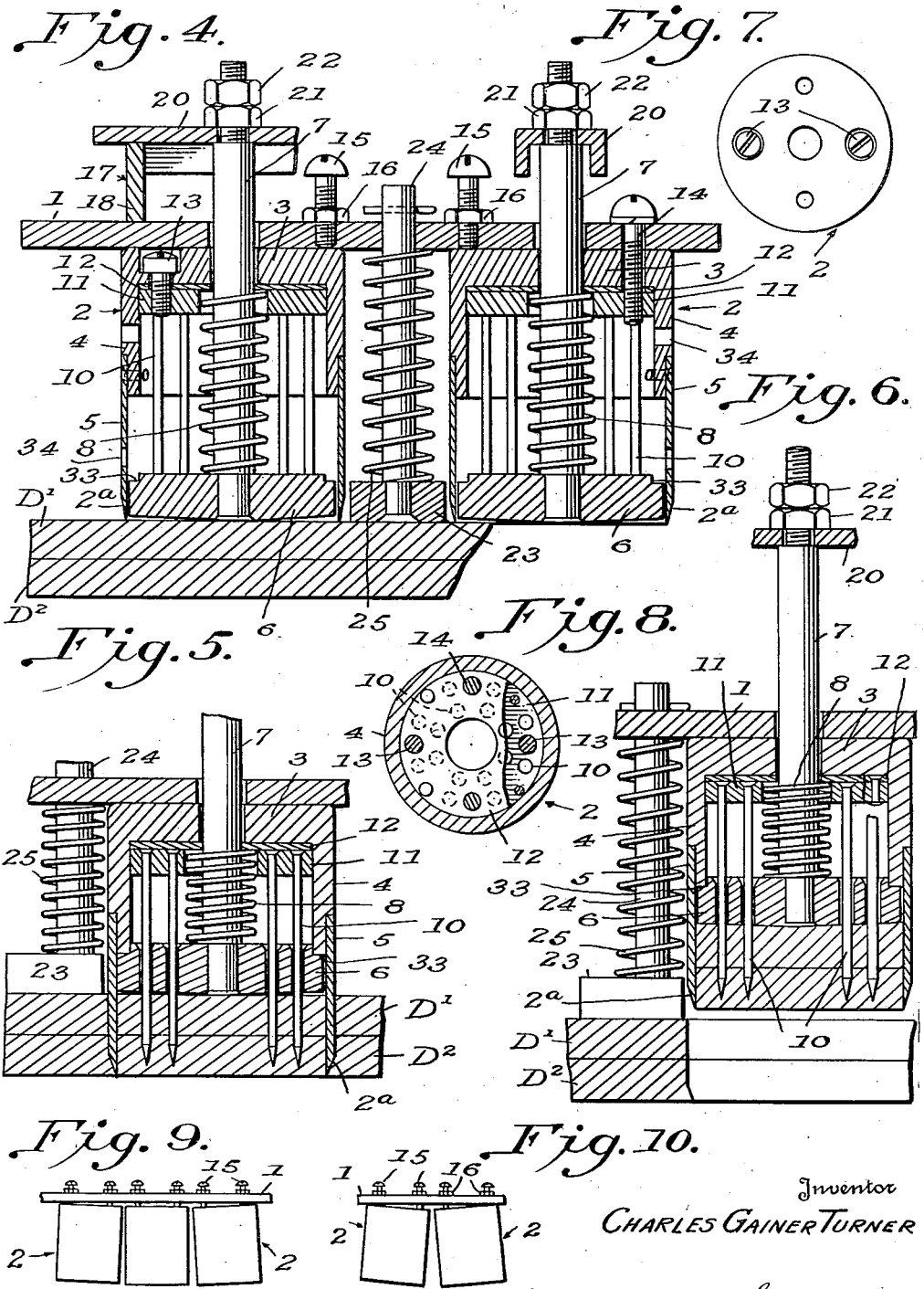
Inventor
CHARLES GAINER TURNER
By Dorsey, Cole & Garner
Attorneys Patented Apr. 11, 1944

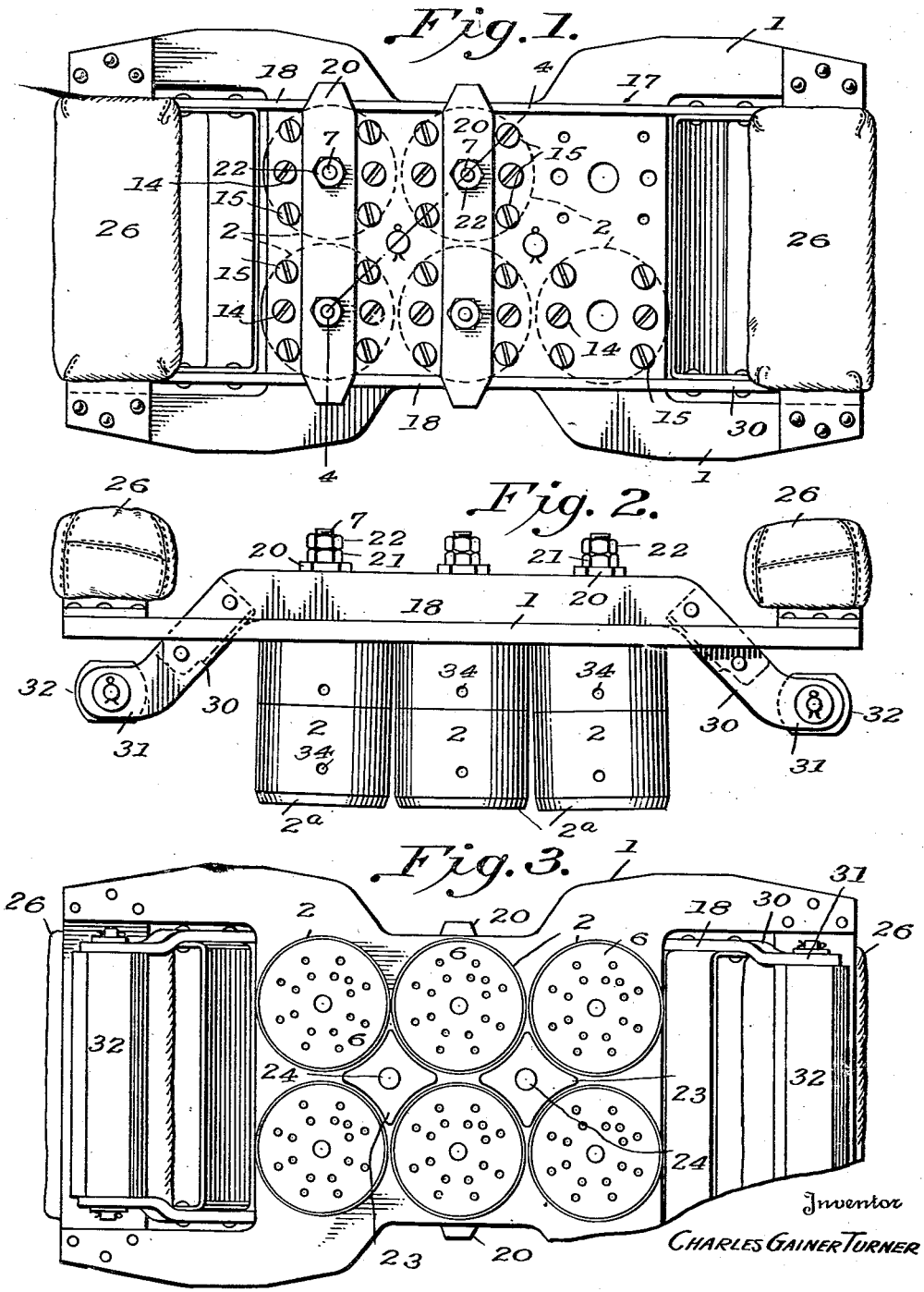

2,346,242

UNITED STATES PATENT OFFICE 2,346,242

APPARATUS FOR CUTTING AND PANNING BISCUITS

Charles Gainer Turner, Atlanta, Ga.

Application August 2, 1940, Serial No. 349,667

2 Claims. (Cl. 107—47)

This invention relates to apparatus for cutting and panning biscuits, and is especially directed to meeting the needs for a cutter which will cut and pan biscuits made from yeast dough or any other dough or material which contracts or shrinks rapidly when a complete or through cut is made in the sheet of dough.

The present invention embodies certain improvements hereinafter described in the dough-cutting and panning device disclosed in my application, Serial No. 253,901, filed January 31, 1939 and issued June 17, 1941, as Patent No. 2,246,424.

A popular biscuit on the market today is what is known as the butter biscuit, and it is made from yeast dough. Biscuits of this type are made up of two or more layers of dough having between them a film of melted butter, vegetable oil, or the like. This film of fatty or oleaginous material is entirely devoid of adhesiveness, which renders it very difficult to handle without dropping the bottom layer of dough or disturbing its aligned position with the top or intermediate layers of dough, or otherwise disfiguring the biscuit blank. Because of the above difficulties, practically all butter biscuits are made by hand. An ordinary or common type of single piece domestic cutter is used, and after the biscuits are cut, they are left on the table to be taken up by a second operator who picks them up by hand and places them in the baking pans. This practice, of course, is unsanitary, slow, and expensive, and at best, only produces biscuits of varying size and distorted shape. Biscuits so cut are difficult to wrap by machinery with any rapidity, because of the wide variation in the size of the package. In view of the conditions just explained, biscuits cut by hand with a single cutter, obviously increase materially the cost to the consumer.

The present invention avoids the difficulties above mentioned, and enables a single operator both to cut and pan many hundred dozen of biscuits per hour, with a hand operated device which cuts and pans one dozen biscuits at a single operation. For the sake of simplicity, however, I have shown and described a cutter adapted to cut six biscuits at a single operation. Obviously, the number of individual cutters with their accompanying mechanism can be multiplied to a reasonable degree, having in mind the weight of the cutting and panning unit as a whole, and the fact that the operator usually works continuously throughout a given period.

In the present invention, a plurality of individual cutters are utilized, each having an ejecting device which operates to eject the dough from within the cutter. In some instances the ejector may be used to compress momentarily the dough within the cutter. A plurality of docking or spit pins are included within each cutter, and extend downwardly to a point nearly equal to the lower or cutting edge of the cutter. The function of these devices will be more fully described.

Another feature of my invention is the arrangement of the cutters in longitudinal and transverse directions in such a way that the cutting device as a whole presents an arcuate or convexed cutting surface in both directions. This permits the operator to give the cutter unit a slight rocking motion which insures a complete cutting through of all of the biscuits to be cut by the unit.

Suitable provision is also made for the ejection or scrapping of the surplus dough, without requiring any independent or separate action on the part of the operator. Other features of my invention will be more fully disclosed in the following detailed description, and with reference to the accompanying drawings, wherein:

Figure 1 is a top plan view of the dough-cutting and panning unit.

Figure 2 is a side view thereof.

Figure 3 is a bottom plan view.

Figure 4 is a section on the line 4—4 of Figure 1, and showing multiple layers of dough beneath the cutters.

Figure 5 is a sectional view through one of the individual cutting devices illustrating the cutting of a biscuit from a plurality of sheets of dough, and also showing the position of the ejector and the spit pins at this time.

Figure 6 is a section through one of the individual cutters with its associated mechanism, showing the biscuit consisting of a plurality of sheets of dough located within the cutter and ready to be transported for panning.

Figure 7 is a plan view of one cutter assembly.

Figure 8 is a horizontal cross section of the spit pin assembly.

Figures 9 and 10 are diagrammatic views, somewhat exaggerated, illustrating the arrangement of the cutters longitudinally and transversely, so as to form in both directions, an arcuate or concaved cutting surface for the cutting unit as a whole.

Referring more particularly to the drawings, wherein like numerals and references designate corresponding parts throughout the several views, 1 indicates a base or supporting plate to the under side of which is secured in a manner to be presently described, a plurality of cylindrical or otherwise suitably shaped cutting members 2, these cutting members having their lower edges tapered or sharpened, as at 2ª.

Inasmuch as each cutting member and its associated parts are alike, only one will be described. Each cutting member 2 may be fashioned, as shown in Figures 4, 5 and 6, and consists of the top wall 3, and a depending side wall or skirt 4. The lower part of this skirt is recessed to receive the cutter 5 which may be pinned or otherwise secured to the side wall 4.

An ejector 6 which in some cases may be used also as a compressor, is suitably arranged for free sliding movement within the cutter 5. The ejector is carried on the lower end of a vertical rod 7, and tends to move toward the cutting edge 2ª of the cutter under the influence of the expansion spring 8.

The ejector 6 is suitably perforated, as shown in the drawings to permit easy passage therethrough of a plurality of docking or spit pins 10 which are located also within each cutting member. The number of spit pins should be such that their aggregate surface area is sufficient to provide satisfactory adhesive contact of the dough for delivery to the receiving pan. The lower ends of the spit pins are sharpened and extend downwardly to a point almost coincident with the plane of the cutting edge 2ª. The upper ends of the docking pins 10 are secured to a head 11, and as shown, this may be accomplished, although not necessarily, by swaging the upper ends of the pins in recesses formed in the top surface of the head 11. A plate 12 covers the head 11 and the swaged heads of the docking pins 10. This plate 12 may be riveted or otherwise secured to the head 11. The arrangement of securing the spit pins as just described, serves to hold them in a fixed and immovable position with respect to the head 11.

The head 11 is secured to the top wall 3 of the cutting member 2 by means of recessed or counter-sunk screws 13, as shown in Figures 4 and 7.

The cutting device 2 through its top wall 3 is secured to the under surface of the base plate 1 by the screws 14, as shown in Figs. 1 and 4, subject, however, to adjustability under the action of the adjusting screws 15, shown in the same figures.

The screws 15, with their lock nuts 16, are for the purpose of providing a desirable cant to each of the cutting devices 2, with a consequent inclination of the cutting edges 2ª to the horizontal, in a direction longitudinally and transversely of the cutter unit, as shown diagrammatically, and in exaggerated form in Figures 9 and 10. When the adjusting screws are properly set, the cutting edges 2ª of the cutting device will form roughly, an arcuate or convex cutting surface for the entire cutting unit. This arrangement permits the cutting unit to be rocked in the two directions indicated, thereby assuring that a complete cut through the several sheets or layers of dough will be made by each individual cutting device 2. To accomplish the proper setting, as just described, it may be necessary to relieve or loosen slightly, the screws 14. When the proper setting is obtained, the locking nuts 16 are tightened, and the screws 14 moved likewise. It will be observed from the position of the adjusting screws 15, as indicated in Figure 1, that the setting, as diagrammatically illustrated in Figures 9 and 10 can be readily accomplished. The adjusting screws 15 may also be used to vary the volume of the cutter cylinder 4 to accommodate dough of different thicknesses.

As shown in Figure 9, the intermediate cutting devices 2 are not canted in a longitudinal direction, but preferably are canted in a transverse direction, as indicated in Figure 10. It is desirable, but not necessary, that this system of adjustment, especially as concerns central or intermediate cutting members, be carried out in principle regardless of the number of individual cutting devices going to make up the complete cutting unit. The cutting edge of any cutter substantially surrounded by other cutters should remain in a horizontal plane.

Instead of adjusting the cutting cylinders they may be fixed perpendicularly to the base plate and their cutting edges turned or ground to produce the inclination described above.

An actuating member 17 is provided to move the ejectors 6 upwardly within the cutting cylinder 5, and against the action of the spring 8. This actuating member may assume various forms and as shown, consists of two parallel bars 18, connected together by the brackets 19, and lying for the most part above the base plate 1. A plurality of cross-heads 20 extend across the bars 18, and each of them are bored sufficiently large to receive loosely the upper end of the rod 7 which carries the ejector 6. The upper end of the rod 7 is connected to the crosshead 20 by means of nut 21 and lock nut 22.

In order to prevent scrapped dough, i. e., dough which would normally be forced into the spaces between the cylinders during the cutting operation, from being carried over to the pans after the cutting of the biscuits, there is provided between the cutting members 2, the strippers 23 shaped to fill the larger voids between the members, as shown in Figs. 3 and 4. The lower surface of the strippers normally lie in the same plane as the cutting edges 2ª, of the cutting members 2, or extend slightly below the same. These strippers are carried on a rod 24, the upper end of which is slidably secured in the base plate 1. An expansion spring 25 is interposed between the stripper and the base plate, thus serving to hold yieldingly the stripper 23 in its lower-most position.

The ends of the base plate 1 carry suitable handles 26, as shown in Figs. 1, 2 and 3.

The bars 18 near their outer ends are bent downwardly, as at 30, passing through the base plate 1, and terminate in end portions 31 to which are attached the handles 32. It will be observed that the handles 32 which operate the ejectors 6 lie below, but within finger reach of the handles 26 attached to the supporting plate 1.

The upward movement of the ejector 6 may be limited by the shoulder 33 on the lower end of the side wall 4.

Vents 34 are provided, as shown in Figure 2, for the escape of air or gas which might otherwise influence successful operation.

The method of using the above described device in cutting and panning butter biscuits, as above described, is as follows:

A mass of dough is broken into two or more sheets. Between each sheet of dough $D^1$—$D^2$ there is interposed a thin layer or film of melted butter, vegetable oil, or the like. The biscuit dough thus constituted, is placed in cutting position. With the parts of the cutting unit occupying the positions shown in Figures 2 and 4, the operator grasps the cutting unit by the handles 26 and 32 with a squeezing movement of the hands moves the handles toward one another relatively. This act moves the ejectors 6 upwardly in the cutting member 2, and away from the cutting edge 2ª to a distance slightly greater than the thickness of the dough sheet to be cut. The cutter unit, grasped as just described, is pressed or forced downwardly into and through the composite sheet of dough, thus cutting individual biscuits therefrom. During the cutting, the unit is preferably rocked longitudinally and transversely to insure complete cutting of each biscuit, this being aided by a canting of the individual cutting devices as previously described and diagrammatically shown in Figures 9 and 10.

Simultaneous with the cutting of the biscuit, the spit pins pass through the several layers of dough and through or nearly through the entire lower layer $D^2$, as shown in Figure 5. The inclusion of the biscuit within the cutter 2 permits it to contract, and owing to the sufficient number of spit pins, the several layers of dough will readily adhere thereto, despite the fact that there is no adhesion between the several layers.

The cutting operation being completed and the parts of the cutting unit remaining in the same positions as described above, the operator lifts the cutting unit and swings it with the several biscuits therein to the receiving pan, whereupon the handles 32 are released, permitting the ejector 6 to force the biscuits out of the cutting members and off the spit pins into the receiving pan. The fact that the several layers of dough constituting the biscuit are confined by the cutting member 2 and adhere to the spit pins, insures an even and accurate alignment of the dough layers upon delivery to the reeciving pan.

The spit pins, in addition to performing the function above described, impress small holes in the biscuit for the escape of air and gas occasioned by the cooking operation. This puncturing of the biscuit for the purpose just described, serves to produce cooked biscuits of uniform size and texture.

Upon the completion of the cutting operation, and as the cutter is lifted upon the cut dough, the strippers 23 force downwardly away from the cutting unit, any scrapped dough which would have a tendency to adhere thereto and be carried over to the receiving pan.

When working with a dough having a low contraction value or an inert dough, prior to or during the cutting operation, the handles 32 may be released. This will cause the dough being cut to be compacted or compressed by the ejector 6 under the influence of the spring 8. This will serve to expand the dough laterally against the inner wall of the cutter 2 and into intimate contact with the spit pins. Experience has shown that this expansion of the dough for the purpose of maintaining it securely within the cutting member 2 is assured by providing a convexed under-surface on the ejector. Upon completion of the cutting operation the handles 32 should be grasped so that the cut dough is no longer under the pressure of the ejector 6. With the parts in this position and the biscuit within the cutter it is lifted and transported to the pan.

While the apparatus herein disclosed has been described in connection with the manufacture of butter biscuits or biscuits composed of several layers of dough having an interposed film of butter or vegetable oil, it will be understood that the same device may be utilized for cutting biscuits from a single layer or sheet of dough and that the several steps described herein may be utilized in this connection.

As previously indicated, for simplicity I have shown the cutting unit consisting of six individual cutting members and have described the inclination or canting of the cutting edges in respect to such a construction. Obviously the number of cutters going up to make up the unit may be increased. For example, nine cutters may be used in rows of three by three, or twelve cutters may be used in rows of three by four. The cutters may be also arranged in circular form with a central cutter and in this instance the cutters in the outer circle of the arrangement will be inclined upwardly. According to the principle indicated in the three instances named, there will be a central cutter, the cutting edge of which will not by preference be canted or inclined, but will be parallel to the under surface of the dough being cut. This will insure a complete cutting of the dough by all of the cutters.

What is claimed is:

1. In a multiple cutter unit for biscuits, the combination of a supporting plate, a plurality of cutting members carried thereby and provided with cutting edges, the planes of the several cutting edges being so arranged as to simulate arcs in directions longitudinally and transversely of the unit, whereby a rocking motion of the unit in either of said directions may be obtained.

2. In a multiple cutter unit for biscuits, the combination of a supporting plate, a plurality of cutting members carried thereby and provided with cutting edges, the planes of the several cutting edges being so arranged as to provide a convex cutting surface for the unit as a whole in directions longitudinally and transversely of the unit, whereby a rocking motion of the unit in either of said directions may be obtained.

CHARLES GAINER TURNER.